US010822442B2

(12) United States Patent
Chudomel et al.

(10) Patent No.: US 10,822,442 B2
(45) Date of Patent: Nov. 3, 2020

(54) RHEOLOGY-MODIFYING AGENTS FOR SLURRIES

(71) Applicant: Ecolab USA Inc., St. Paul, MN (US)

(72) Inventors: J. Matthew Chudomel, Aurora, IL (US); Yogesh Bhole, Pune (IN); Jitendra Shah, Naperville, IL (US)

(73) Assignee: ECOLAB USA INC., St. Paul, MN (US)

( * ) Notice: Subject to any disclaimer, the term of this patent is extended or adjusted under 35 U.S.C. 154(b) by 24 days.

(21) Appl. No.: 16/029,978

(22) Filed: Jul. 9, 2018

(65) Prior Publication Data
US 2019/0016837 A1 Jan. 17, 2019

Related U.S. Application Data

(60) Provisional application No. 62/533,245, filed on Jul. 17, 2017.

(51) Int. Cl.
| *C04B 2/00* | (2006.01) |
| *C08L 33/00* | (2006.01) |
| *C08F 220/06* | (2006.01) |
| *C08K 3/22* | (2006.01) |
| *C08K 3/26* | (2006.01) |
| *C01F 5/14* | (2006.01) |
| *C01F 11/02* | (2006.01) |
| *B01D 53/14* | (2006.01) |
| *C02F 5/06* | (2006.01) |
| *C02F 1/66* | (2006.01) |

(52) U.S. Cl.
CPC ............. *C08F 220/06* (2013.01); *C01F 5/14* (2013.01); *C01F 11/02* (2013.01); *C08K 3/22* (2013.01); *C08K 3/26* (2013.01); *B01D 53/1468* (2013.01); *B01D 53/1475* (2013.01); *B01D 53/1481* (2013.01); *C01P 2006/22* (2013.01); *C02F 1/66* (2013.01); *C02F 5/06* (2013.01); *C08K 2003/222* (2013.01); *C08K 2003/262* (2013.01); *C08K 2201/019* (2013.01)

(58) Field of Classification Search
CPC ...... C02F 5/10; C02F 5/11; C02F 5/02; C02F 5/08; C02F 1/52; C01F 5/02; C04B 2/00; C08L 33/00; C08L 33/02; C08L 33/04
See application file for complete search history.

(56) References Cited

U.S. PATENT DOCUMENTS

| | | |
|---|---|---|
| 2,178,139 A | 10/1939 | Epstein et al. |
| 2,202,601 A | 5/1940 | Ried |
| 3,793,299 A | 2/1974 | Zimmerer |
| 4,230,610 A | 10/1980 | Falcione et al. |
| 4,374,702 A | 2/1983 | Turbak et al. |
| 4,385,961 A | 5/1983 | Svending et al. |
| 4,388,150 A | 6/1983 | Sunden et al. |
| 4,636,379 A | 1/1987 | Bestek et al. |
| 4,711,727 A | 12/1987 | Matthews et al. |
| 4,743,396 A | 5/1988 | Fong et al. |
| 4,753,710 A | 6/1988 | Langley et al. |
| 4,783,314 A | 11/1988 | Hoots et al. |
| 4,889,653 A | 12/1989 | Ahmed et al. |
| 4,913,775 A | 4/1990 | Langley et al. |
| 4,966,652 A | 10/1990 | Wasser |
| 4,992,380 A | 2/1991 | Moriarty et al. |
| 5,082,639 A | 1/1992 | Lee et al. |
| 5,098,520 A | 3/1992 | Begala |
| 5,116,417 A | 5/1992 | Walker, Jr. et al. |
| 5,167,776 A | 12/1992 | Bhaskar et al. |
| 5,171,450 A | 12/1992 | Hoots |
| 5,182,062 A | 1/1993 | Lee et al. |
| 5,228,808 A | 7/1993 | McKennon et al. |
| 5,254,221 A | 10/1993 | Lowry et al. |
| 5,264,009 A | 11/1993 | Khan |
| 5,274,055 A | 12/1993 | Honig et al. |
| 5,306,475 A | 4/1994 | Fichtel et al. |
| 5,310,498 A | 5/1994 | Lee et al. |
| 5,332,436 A | 7/1994 | Walker, Jr. et al. |
| 5,336,022 A | 8/1994 | McKennon et al. |
| 5,346,589 A | 9/1994 | Braunstein et al. |
| 5,350,596 A | 9/1994 | Walker, Jr. |
| 5,352,647 A | 10/1994 | Suchenwirth |
| 5,399,048 A | 3/1995 | Walker |
| 5,409,605 A | 4/1995 | Haley et al. |
| 5,419,839 A | 5/1995 | Haley et al. |
| 5,492,685 A | 2/1996 | Moran et al. |
| 5,502,021 A | 3/1996 | Schuster |
| 5,507,572 A | 4/1996 | Shields et al. |
| 5,512,093 A | 4/1996 | Huege et al. |
| 5,544,971 A | 8/1996 | Huege et al. |
| 5,589,107 A | 12/1996 | Scheurman, III |
| 5,616,283 A | 4/1997 | Huege et al. |
| 5,618,508 A | 4/1997 | Suchenwirth et al. |
| 5,620,744 A | 4/1997 | Huege et al. |
| 5,628,261 A | 5/1997 | Beckstead et al. |
| 5,702,247 A | 12/1997 | Schoof |
| 5,714,118 A | 2/1998 | Scheurman, III |
| 5,746,819 A | 5/1998 | Kostelnik et al. |
| 5,792,440 A | 8/1998 | Huege |
| 5,840,158 A | 11/1998 | Choo et al. |

(Continued)

FOREIGN PATENT DOCUMENTS

| AT | 215514 T | 4/2002 |
| AT | 244064 T | 7/2003 |

(Continued)

OTHER PUBLICATIONS

International Search Report and Written Opinion for PCT/US2018/041254, dated Oct. 1, 2018, 13 pages.

(Continued)

*Primary Examiner* — Haidung D Nguyen
(74) *Attorney, Agent, or Firm* — Eric D. Babych; Barnes & Thornburg LLP

(57) ABSTRACT

The present disclosure relates to rheology-modifying agents and methods of modifying the rheology of slurries. A rheology-modifying agent may be added to a slurry. The rheology-modifying agent may include a polymer and the polymer may include at least three chemically different monomers. The slurry may include lime and/or magnesium hydroxide.

19 Claims, No Drawings

(56) References Cited

U.S. PATENT DOCUMENTS

| | | |
|---|---|---|
| 5,876,698 A | 3/1999 | Webeling et al. |
| 5,877,247 A * | 3/1999 | Mahar .................. A61K 8/19 |
| | | 524/433 |
| 5,939,036 A | 8/1999 | Porter et al. |
| 5,951,751 A | 9/1999 | Williams et al. |
| 5,994,443 A | 11/1999 | Ehrat et al. |
| 6,027,558 A | 2/2000 | Little et al. |
| 6,059,974 A | 5/2000 | Scheurman, III |
| 6,071,379 A | 6/2000 | Wong Shing et al. |
| 6,090,878 A | 7/2000 | Ehrat et al. |
| 6,296,761 B1 | 10/2001 | Scheurman, III |
| 6,344,511 B1 | 2/2002 | Ehrat et al. |
| 6,361,604 B2 | 3/2002 | Pendleton et al. |
| 6,361,652 B2 | 3/2002 | Keiser et al. |
| 6,361,653 B2 | 3/2002 | Keiser et al. |
| 6,372,805 B1 | 4/2002 | Keiser et al. |
| 6,379,753 B1 | 4/2002 | Soane et al. |
| 6,395,205 B1 | 5/2002 | Huege et al. |
| 6,395,813 B1 | 5/2002 | Duccini et al. |
| 6,412,974 B1 | 7/2002 | Scholl et al. |
| 6,436,878 B1 | 8/2002 | Wang et al. |
| 6,486,216 B1 | 11/2002 | Keiser et al. |
| 6,592,718 B1 | 7/2003 | Wong Shing et al. |
| 6,605,674 B1 | 8/2003 | Whipple et al. |
| 6,926,879 B2 | 8/2005 | Huege et al. |
| 6,939,523 B2 | 9/2005 | D'Alesandro |
| 7,047,134 B2 | 5/2006 | Berger et al. |
| 7,105,114 B2 | 9/2006 | Huege et al. |
| 7,125,469 B2 | 10/2006 | Barcus et al. |
| 7,202,197 B2 | 4/2007 | Huege et al. |
| 7,326,400 B2 | 2/2008 | Huege |
| 7,338,649 B2 | 3/2008 | Huege et al. |
| 7,377,773 B2 | 5/2008 | Nolan et al. |
| 7,378,073 B2 | 5/2008 | de Pauw Gerlings |
| 7,470,739 B2 | 12/2008 | Gane et al. |
| 7,473,334 B2 | 1/2009 | Wong Shing et al. |
| 7,497,924 B2 | 3/2009 | Nguyen et al. |
| 7,514,488 B2 | 4/2009 | Gane et al. |
| 7,615,135 B2 | 11/2009 | Harrington et al. |
| 7,641,776 B2 | 1/2010 | Nagar et al. |
| 7,691,190 B2 | 4/2010 | Ingram et al. |
| 7,691,346 B2 | 4/2010 | Curtis et al. |
| 7,718,085 B1 | 5/2010 | Scheurman, III |
| 7,829,738 B1 | 11/2010 | Brammer, Jr. et al. |
| 7,897,062 B1 | 3/2011 | Scheurman, III |
| 7,955,504 B1 | 6/2011 | Jovanovic et al. |
| 7,993,451 B2 | 8/2011 | Brouillette et al. |
| 7,995,504 B2 | 8/2011 | Ransom et al. |
| 8,012,758 B2 | 9/2011 | Enzien et al. |
| 8,021,518 B2 | 9/2011 | Furman et al. |
| 8,066,847 B2 | 11/2011 | Grigoriev et al. |
| 8,067,629 B2 | 11/2011 | Tong |
| 8,071,667 B2 | 12/2011 | Furman, Jr. et al. |
| 8,082,649 B2 | 12/2011 | Rider |
| 8,088,213 B2 | 1/2012 | Cheng et al. |
| 8,092,618 B2 | 1/2012 | Sharpe et al. |
| 8,092,649 B2 | 1/2012 | Shevchenko et al. |
| 8,097,687 B2 | 1/2012 | Kurian et al. |
| 8,101,045 B2 | 1/2012 | Furman et al. |
| 8,123,042 B2 | 2/2012 | Tran |
| 8,172,983 B2 | 5/2012 | Cheng et al. |
| 8,206,680 B2 | 6/2012 | Chavez et al. |
| 8,242,287 B2 | 8/2012 | Schertzer et al. |
| 8,246,780 B2 | 8/2012 | Duggirala et al. |
| 8,247,593 B2 | 8/2012 | Morrison et al. |
| 8,247,597 B2 | 8/2012 | Fair et al. |
| 8,258,208 B2 | 9/2012 | Kurian et al. |
| 8,262,852 B2 | 9/2012 | Duggirala et al. |
| 8,262,858 B2 | 9/2012 | Duggirala et al. |
| 8,288,835 B2 | 10/2012 | Quevy et al. |
| 8,298,439 B2 | 10/2012 | Blubaugh et al. |
| 8,298,508 B2 | 10/2012 | Wang et al. |
| 8,302,778 B2 | 11/2012 | Tran |
| 8,366,877 B2 | 2/2013 | Duggirala et al. |
| 8,382,947 B2 | 2/2013 | Skaggs et al. |
| 8,382,950 B2 | 2/2013 | Cheng |
| 8,398,901 B2 | 3/2013 | Beck et al. |
| 8,414,739 B2 | 4/2013 | Kimura et al. |
| 8,430,956 B2 | 4/2013 | Brouillette et al. |
| 8,440,052 B2 | 5/2013 | Duggirala et al. |
| 8,440,163 B2 | 5/2013 | Gross-Lorgouilloux et al. |
| 8,444,812 B2 | 5/2013 | Grigoriev et al. |
| 8,465,623 B2 | 6/2013 | Zhao et al. |
| 8,714,809 B2 | 5/2014 | Brouillette et al. |
| 8,945,345 B2 | 2/2015 | Laine et al. |
| 9,034,145 B2 | 5/2015 | Castro et al. |
| 9,309,151 B2 | 4/2016 | Scheurman, III |
| 9,511,340 B2 | 12/2016 | Laurent |
| 2001/0045186 A1 | 11/2001 | Pendleton et al. |
| 2003/0121457 A1 | 7/2003 | Butters |
| 2003/0207101 A1 | 11/2003 | Huege et al. |
| 2004/0109807 A1 | 6/2004 | D'Alesandro |
| 2004/0129175 A1 | 7/2004 | Butters et al. |
| 2004/0191163 A1 | 9/2004 | Huege |
| 2004/0208809 A1 | 10/2004 | D'Alesandro |
| 2004/0258612 A1 | 12/2004 | Huege et al. |
| 2005/0025659 A1 | 2/2005 | Godfrey et al. |
| 2005/0205839 A1 | 9/2005 | Kawakatsu |
| 2005/0216195 A1 | 9/2005 | Berger et al. |
| 2005/0287055 A1 | 12/2005 | Huege et al. |
| 2006/0032327 A1 | 2/2006 | Huege et al. |
| 2006/0144535 A1 | 7/2006 | Nguyen et al. |
| 2006/0275203 A1 | 12/2006 | Chavez et al. |
| 2007/0036701 A1 | 2/2007 | Huege |
| 2007/0036702 A1 | 2/2007 | Huege |
| 2007/0098610 A1 | 5/2007 | Ingram et al. |
| 2007/0104630 A1 | 5/2007 | Huege |
| 2008/0032247 A1 | 2/2008 | Nolan et al. |
| 2008/0206126 A1 | 8/2008 | Benson et al. |
| 2008/0265222 A1 | 10/2008 | Ozersky et al. |
| 2008/0317649 A1 | 12/2008 | Curtis et al. |
| 2009/0145987 A1 | 6/2009 | Gane et al. |
| 2009/0173692 A1 | 7/2009 | Laraway et al. |
| 2010/0305007 A1 | 12/2010 | Spindler et al. |
| 2010/0313619 A1 | 12/2010 | Biotteau et al. |
| 2011/0011305 A1 | 1/2011 | Maijala et al. |
| 2011/0182990 A1 | 7/2011 | Su et al. |
| 2011/0196094 A1 | 8/2011 | Hamad et al. |
| 2011/0250341 A1 | 10/2011 | Keiser et al. |
| 2011/0277947 A1 | 11/2011 | Hua et al. |
| 2011/0293932 A1 | 12/2011 | Jiang et al. |
| 2013/0000855 A1 | 1/2013 | Nuopponen et al. |
| 2013/0129658 A1* | 5/2013 | Nguyen-Kim ....... A61K 8/8147 |
| | | 424/70.16 |
| 2013/0139856 A1 | 6/2013 | Vinson et al. |
| 2013/0146099 A1 | 6/2013 | Monsrud et al. |
| 2013/0146102 A1 | 6/2013 | Monsrud et al. |
| 2013/0146425 A1 | 6/2013 | Tokhtuev |
| 2013/0187087 A1 | 7/2013 | Scheurman, III |
| 2013/0213264 A1 | 8/2013 | Hein et al. |
| 2013/0233550 A1 | 9/2013 | Brothers et al. |
| 2014/0048267 A1 | 2/2014 | Pisklak et al. |
| 2014/0083416 A1 | 3/2014 | Nuopponen et al. |
| 2014/0140907 A1 | 5/2014 | Belli et al. |
| 2014/0196632 A1 | 7/2014 | Brouillette et al. |
| 2014/0301966 A1* | 10/2014 | Hough .................. A61K 8/91 |
| | | 424/70.16 |
| 2014/0326675 A1* | 11/2014 | Gill .................. C02F 5/105 |
| | | 210/701 |
| 2015/0041091 A1 | 2/2015 | Castro et al. |
| 2015/0072902 A1 | 3/2015 | Lafitte et al. |
| 2015/0184078 A1 | 7/2015 | Lorgouilloux et al. |

FOREIGN PATENT DOCUMENTS

| | | |
|---|---|---|
| AT | 296685 T | 6/2005 |
| AU | 645231 B | 1/1994 |
| BE | 1006309 A4 | 7/1994 |
| BR | PI9300971 A | 11/1994 |
| BR | PI0714801 A2 | 9/2013 |
| CA | 2055925 A1 | 5/1992 |
| CA | 2131793 A1 | 9/1993 |
| CA | 2229020 A1 | 3/1997 |

(56) References Cited

FOREIGN PATENT DOCUMENTS

| | | |
|---|---|---|
| CA | 2232302 A1 | 3/1997 |
| CA | 2261115 A1 | 1/1998 |
| CA | 2203210 A1 | 10/1998 |
| CA | 2294129 A1 | 12/1998 |
| CA | 2296499 A1 | 1/1999 |
| CA | 2232302 C | 7/2001 |
| CA | 2055925 C | 12/2002 |
| CA | 2131793 C | 7/2003 |
| CA | 2618137 A1 | 2/2007 |
| CA | 2261115 C | 6/2007 |
| CA | 2229020 C | 8/2008 |
| CA | 2294129 C | 9/2011 |
| CN | 101182149 A | 5/2008 |
| CN | 101565198 A | 10/2009 |
| CN | 201485386 U | 5/2010 |
| CN | 101840821 A | 9/2010 |
| CN | 101565198 B | 6/2011 |
| CN | 102180979 A | 9/2011 |
| CN | 102284239 A | 12/2011 |
| CN | 102284239 B | 7/2012 |
| CN | 103011227 A | 4/2013 |
| CN | 103011228 A | 4/2013 |
| CN | 103086661 A | 5/2013 |
| CN | 102633445 B | 7/2013 |
| CN | 103387245 A | 11/2013 |
| CN | 203437026 U | 2/2014 |
| DE | 4302539 A1 | 8/1993 |
| DE | 19721205 C1 | 7/1998 |
| DE | 20117018 U1 | 7/2002 |
| DE | 69620423 T2 | 11/2002 |
| DE | 69628926 T2 | 6/2004 |
| DE | 69733409 T2 | 4/2006 |
| EP | 0377010 A1 | 7/1990 |
| EP | 0594332 A1 | 4/1994 |
| EP | 0655273 A2 | 5/1995 |
| EP | 0655273 A3 | 7/1995 |
| EP | 0815391 A1 | 1/1998 |
| EP | 0848647 A1 | 6/1998 |
| EP | 0851839 A1 | 7/1998 |
| EP | 0874698 A1 | 11/1998 |
| EP | 0851839 A4 | 12/1998 |
| EP | 0848647 A4 | 2/1999 |
| EP | 0912456 A1 | 5/1999 |
| EP | 0815391 A4 | 8/1999 |
| EP | 0998535 A4 | 10/2000 |
| EP | 0851839 B1 | 4/2002 |
| EP | 0874698 B1 | 6/2005 |
| EP | 0912456 A4 | 4/2007 |
| EP | 1928783 A2 | 6/2008 |
| EP | 0874698 A4 | 1/2009 |
| EP | 2074368 A2 | 7/2009 |
| EP | 2135944 A1 | 12/2009 |
| EP | 2074368 A4 | 10/2010 |
| EP | 1928783 A4 | 5/2012 |
| ES | 2175072 T3 | 11/2002 |
| ES | 2202468 T3 | 4/2004 |
| ES | 2242975 T3 | 11/2005 |
| FR | 2669327 A1 | 5/1992 |
| FR | 2669327 B1 | 7/1994 |
| FR | 2816937 A1 | 5/2002 |
| GB | 2157584 A | 10/1985 |
| JP | H 01208317 A | 8/1989 |
| JP | 02593891 B2 | 3/1997 |
| JP | H 0957081 A | 3/1997 |
| JP | H 09225255 A | 9/1997 |
| JP | H 1190385 A | 4/1999 |
| JP | H 11268912 A | 10/1999 |
| JP | 2000081731 A | 3/2000 |
| JP | 2000239054 A | 9/2000 |
| JP | 2000266312 A | 9/2000 |
| JP | 2001158617 A | 6/2001 |
| JP | 2002113327 A | 4/2002 |
| JP | 3813374 B2 | 8/2006 |
| JP | 3847504 B2 | 11/2006 |
| JP | 2006298732 A | 11/2006 |
| JP | 3945605 B2 | 7/2007 |
| JP | 2008074629 A | 4/2008 |
| JP | 2009063288 A | 3/2009 |
| JP | 4287941 B2 | 7/2009 |
| JP | 2009179502 A | 8/2009 |
| JP | 4667577 B2 | 4/2011 |
| JP | 4703708 B2 | 6/2011 |
| JP | 4606238 B2 | 10/2011 |
| JP | 2011228062 A | 11/2011 |
| JP | 51055292 B2 | 12/2012 |
| JP | 5408018 B2 | 2/2014 |
| KR | 2003054393 A | 7/2003 |
| KR | 10-2011-0108990 A | 10/2011 |
| KR | 10-1121863 B1 | 2/2012 |
| PL | 176414 B1 | 5/1999 |
| PL | 188927 B1 | 5/2005 |
| RO | 115252 B | 12/1999 |
| RU | 2064904 C1 | 8/1996 |
| WO | WO 1990012822 A1 | 11/1990 |
| WO | WO 1992/001627 A1 | 2/1992 |
| WO | WO 1993/011203 A1 | 6/1993 |
| WO | WO 1993/018190 A1 | 9/1993 |
| WO | WO 1994/006884 A1 | 3/1994 |
| WO | WO 1994/029233 A1 | 12/1994 |
| WO | WO 1996/007520 A1 | 3/1996 |
| WO | WO 1996/013550 A1 | 5/1996 |
| WO | WO 1996/023932 A1 | 8/1996 |
| WO | WO 1997/007882 A1 | 3/1997 |
| WO | WO 1997/011030 A1 | 3/1997 |
| WO | WO 1997/025160 A1 | 7/1997 |
| WO | WO 1997/039991 A1 | 10/1997 |
| WO | WO 1997/046843 A1 | 12/1997 |
| WO | WO 1998/002391 A1 | 1/1998 |
| WO | WO 1998/057892 A1 | 12/1998 |
| WO | WO 1999/002620 A1 | 1/1999 |
| WO | WO 1999/002620 A8 | 4/1999 |
| WO | WO 1996/029541 A1 | 9/1999 |
| WO | WO 2000034182 A1 | 6/2000 |
| WO | WO 2002/092701 A1 | 11/2002 |
| WO | WO 2003/070655 A1 | 8/2003 |
| WO | WO 2004/016566 A1 | 2/2004 |
| WO | WO 2004/052490 A2 | 6/2004 |
| WO | WO 2004/086876 A2 | 10/2004 |
| WO | WO 2004/086876 A3 | 11/2004 |
| WO | WO 2004/052490 A3 | 12/2004 |
| WO | WO 2005/103767 A2 | 11/2005 |
| WO | WO 2005/103767 A3 | 1/2006 |
| WO | WO 2006/000891 A2 | 1/2006 |
| WO | WO 2006/000891 A3 | 4/2006 |
| WO | WO 2007/021646 A2 | 2/2007 |
| WO | WO 2007/021646 A3 | 4/2007 |
| WO | WO 2007/089337 A2 | 8/2007 |
| WO | WO 2007/145310 A1 | 12/2007 |
| WO | WO 2008/008576 A2 | 1/2008 |
| WO | WO 2008/018358 A1 | 2/2008 |
| WO | WO 2008/019003 A2 | 2/2008 |
| WO | WO 2008/033283 A1 | 3/2008 |
| WO | WO 2007/089337 A3 | 4/2008 |
| WO | WO 2008/019003 A3 | 11/2008 |
| WO | WO 2009/109705 A1 | 9/2009 |
| WO | WO 2010/124378 A1 | 11/2010 |
| WO | WO 2010/125247 A2 | 11/2010 |
| WO | WO 2010/134868 A1 | 11/2010 |
| WO | WO 2001/096240 A1 | 12/2011 |
| WO | WO 2012/034997 A1 | 3/2012 |
| WO | WO 2012061147 A1 | 5/2012 |
| WO | WO 2013/112204 A1 | 8/2013 |
| WO | WO 2013/123198 A2 | 8/2013 |
| WO | WO 2013/154926 A1 | 10/2013 |
| WO | WO 2013162902 A1 | 10/2013 |
| WO | WO 2014/019827 A1 | 2/2014 |
| WO | WO 2013/123198 A3 | 3/2014 |
| WO | WO 2014/041068 A1 | 3/2014 |
| WO | WO 2014/064234 A1 | 5/2014 |

(56) References Cited

FOREIGN PATENT DOCUMENTS

| WO | WO 2014/076436 A1 | 5/2014 |
|---|---|---|
| WO | WO 2014/076437 A1 | 5/2014 |

OTHER PUBLICATIONS

Extended European Search Report from EP App. 14834220.7, dated Mar. 17, 2017, 7 pages.
International Search Report for PCT/US2014/035099, dated Aug. 26, 2014, 3 pages.
International Search Report for PCT/US2014/049614, dated Nov. 18, 2014, 3 pages.
International Search Report for PCT/2016/057001, dated Jan. 23, 2017, 4 pages.
Arpin, M.T. and S. Yusup. "Enhancement of Calcium Oxide (CaO) for Carbon Dioxide (CO2) Capture," Canadian Journal of Pure & Applied Sciences, 5(1), (Feb. 2011) pp. 1391-1397.
Barner-Kowollik, Christopher. "Handbook of RAFT Polymerization." Wiley VCH (2008), Chapters 3, 6, 7, 8, 9, 11, and 12.
Berger, Eric, P.E. and H.B. Fitzgerald. "Use of Calcium-Based Products to Stabilize Ponded Coal Ash Techniques and Results." 2009 World of Coal Ash (WOCA) Conference, May 4-7, 2009, Lexington, KY (US), 6 pages. http://www.flyash.info/.
Cui, Guang-hua, X. Peng, J. Geng, and C. Jin. "The research on preparation of magnesium hydroxide slurries," Journal of Hebei Polytechnic University (Natural Science Edition) (Feb. 2010), 32 (1), pp. 48-54. English Abstract on p. 54.
Dagaonkar, Manoj V., A. A.C.M. Beenackers, and V. G. Pangarkar. "Absorption of sulfur dioxide into aqueous reactive slurries of calcium and magnesium hydroxide in a stirred cell," Chemical Engineering Science (2001), 56 (3) pp. 1095-1101.
Dagaonkar, Manoj V. and A. A.C.M. Beenackers. "Development of a high intensity slurry reactor," Recents Progres en Genie des Procedes (1999), 13 (66), pp. 373-380.
Dagaonkar, Manoj V. and A. A.C.M. Beenackers. "Gas absorption into aqueous reactive slurries of calcium and magnesium hydroxide in a multiphase reactor," Catalysis Today (2001), 66 (2-4), pp. 495-501.
Dodd, A.C. and P.G. McComerick. "Synthesis and Processing of Ultrafine Mg-PSZ Powder," Materials Science Forum (1999), vols. 312-314, pp. 221-226.
Enguang, He, S. Wenyu, and C. Shoutian. "Effects of Phosphate Ion on the Growth of Aragonite Whisker in Heterogeneous Precipitation from Suspension of $Ca(OH)_2$," Rare Metal Materials and Engineering (Dec. 2000), 29 (6), pp. 398-402.
Garcia-Carmona, J., J. Gomez-Morales, J. Fraile-Sainz, and R. Rodriguez-Clemente. "Morphological characteristics and aggregation of calcite crystals obtained by bubbling $CO_2$ through a $Ca(OH)_2$ suspension in the presence of additives," Powder Technology (2003), 130, pp. 307-315.
Guangjun, Lu and C. Fangqin. "Preparation of Coal Briquette by Using Coal Waste and Coal Slurry," Advanced Materials Research (2012), vols. 391-392, pp. 755-758.
Hendricks et al. "Water Treatment Unit Processes: Physical and Chemical." New York: CRC Press Taylor & Francis Group (2006), p. 328.
Jun, Liao. "Preparation of Flue Gas Desulfurizing Agent from Carbide Slag Slurry," Environmental Protection of Chemical Industry (Apr. 27, 2007), 27 (4), pp. 361-363.
Li, Haoxin, J. Yang, and H. Zhu, "Influence of Stearic Acid on Portland Cement Performance as Grinding Aids," Advanced Materials Research (2012), vols. 374-377, pp. 1244-1248.
Li, Ruilong, S. Xia, J. Zhu, H. Wu, and F. Zhou. "Experimental investigation of drilling waste slurries solidification with phosphogypsum and cinder ash," Shiyou Yu Tianranqu Huagong (2005), 34 (3), pp. 225-227.
Lovell, Peter A. and M.S. El-Aasser, Editors. "Emulsion Polymerization and Emulsion Polymers." John Wiley and Sons (1997), Chapters 1, 11, 21, and 22.

Maina, P. "Improvement of Lime Reactivity towards Desulfurization by Hydration Agents," Chemical Science Transactions (2013), 2(1), pp. 147-159.
Matsuda, Hitoki and T. Iwashita. "Production of highly reactive $Ca(OH)_2$ by hydration of CaO for highly efficient $SO_2$ dry sorption," Ryusan to Kogyo (2011), 64 (8), pp. 107-114, with machine translation.
Matyjaszewski, Krzysztof, Editor. "Controlled/Living Radical Polymerization: Progress in ATRP, NMP, and RAFT." ACS Symposium Series 768 (2000), Chapter 10.
Matyjaszewski, Krzysztof and T.P. Davis, Editors. "Handbook of Radical Polymerization." John Wiley and Sons (2002), Chapters 3, 10, 11, 12, and 15.
Matyjaszewski, Krzysztof, B.S. Sumerlin, and N.V. Tsarevsky, Editors. "Progress in Controlled Radical Polymerization: Mechanisms and Techniques." ACS Symposium Series 1100 (2009), Chapters 7, 9, 13, 14, 16, 17, 19, and 21.
Odian, George. "Principles of Polymerization, Fourth Edition." John Wiley and Sons (2004), Chapters 1, 3, and 6.
Osada, Yo, M. Sudo, K. Hamaguchi, T. Doi, and E. Shibuya. "Treatment of Flue Gas from a Municipal Solid Waste (MSW) Incinerator by Electron Beam Irradiation," NKK Technical Review (1996), 74, pp. 7-16.
Peel, John D. "Paper Science and Paper Manufacture." Vancouver, BC: Angus Wilde Publications Inc. (1999), p. 90.
Qingfeng, Liu, S. Wenyu, L. Bin, C. Wei, and C. Shoutian. "Preparation of Aragonite by Carbonation Process," Journal of Xi'an Jiaotong University, Xi'an, CN (Dec. 1999), 33 (12), pp. 17-20.
Rowe, R. C. et al. "Handbook of Pharmaceutical Excipients, First Edition." Chemical Industry Press, 2015, 4 pages, with English excerpt.
Sanders, J.F., J. Wang, and T.C. Keener. "Fly Ash Hydration with Quicklime for Improving Sorbent Utilization and $SO_2$ Removal in Spray Dryer Absorbers," United States Environmental Protection Agency, Research and Development, (1995). Proceedings: 1993 $SO_2$ Control Symposium, vol. 2, Paper No. 42, p. 545-548.
Scheurman, Terry. "Selenium Reduction Issues in a Coal Fire Power Plant," Applied Specialties, Inc., Avon Lake, OH, Official Proceedings—66th International Water Conference (2005), 10 pages.
Serraj, Siham, P. Boudeville, B. Pauvert, and A. Terol. "Effect on composition of dry mechanical grinding of calcium phosphate mixtures," Journal of Biomedical Materials Research (2001), 55 (4), pp. 566-575.
Shi, Caijun and R.L. Day. "Comparison of different methods for enhancing reactivity of pozzolans," Cement and Concrete Research, (2001) 31 (5), pp. 813-818.
Smook, Gary A. "Handbook for Pulp & Paper Technologists, Second Edition." Vancouver, BC: Angus Wilde Publications Inc. (1992), Fifth Printing, 2001, pp. 224-225.
Smook, Gary A. "Handbook for Pulp & Paper Technologists, Second Edition." Vancouver, BC: Angus Wilde Publications Inc. (1992), Fifth Printing, 2001, p. 283.
Smook, Gary A. "Handbook for Pulp & Paper Technologists, Third Edition." Vancouver, BC: Angus Wilde Publications Inc. (2002), Chapters 15, 16, and 18.
Spring, R., M. Savoie, Y. Boyer, and M. Leclerc. "Slaker Control at James MaClaren—Toroidal conductivity probes installation has increased efficiency," Pulp & Paper Canada (1996), 97 (12), pp. 148-151.
Stewart, Dorothy A., D. A. Andrews, P.K. Hazen, G.R. Jones, J.B. Partlow, and F. Azarm. "Full Scale Demonstration of FGD Reagents at the Gibbons Creek Stream Electric Station," Chemical Lime Company, Fort Worth, TX. Proceedings, 89th Annual Meeting—Air & Waste Management Association (Jun. 23-28, 1996, Nashville, TN), 18 pages.
Stipniece, Liga, K. Salma-Ancane, N. Borodajenko, M. Sokolova, D. Jakovlevs, and L. Berzina-Cimdina. "Characterization of Mg-substituted hydroxyapatite synthesized by wet chemical method," Ceramics International (2014), 40 (2), pp. 3261-3267.
Sun, Zhenchao, F. Yu, F. Li, S. Li, and L. Fan. "Experimental Study of HCl Capture using CaO Sorbents: Activation, Deactivation, Reactivations, and Ionic Transfer Mechanism," Industrial & Engineering Chemistry Research (2011), 50 (10), pp. 6034-6043.

(56) References Cited

OTHER PUBLICATIONS

Thomson, Margaret L. "Pozzolan-Lime Mortar: Limitations of ASTM C593," ASTM Special Technical Publication , Masonry: Opportunities for the $21^{st}$ Century, ASTM STP 1432, D. Throop and R.E. Klingner, Editors, ASTM International, West Conshohocken, PA (2003) pp. 88-94.

Yang, Jung-Hsin and S. Shih. "Preparation of high surface area $CaCO_3$ by bubbling $CO_2$ in aqueous suspensions of $Ca(OH)_2$: Effects of $(NaPO_3)_6$, $Na_5P_3O_{10}$, and $Na_3PO_4$ additives," Powder Technology (2010), 197 (3), pp. 230-234.

Yang, Xiaofeng, L. Peng, B. Guo, W. Li, and Q. Wang. "Study on the Effect of Ethylene Glycol as Grind Aid on Activity Stimulation of Grade III Fly Ash," Mining and Metallurgical Engineering (Feb. 2010), 30 (1), pp. 84-86.

Yu, Jae Goang and D.S. Kim. Effects of Calcium Hydroxide/ Phosphoric Acid Suspending Agents on the Characteristics of Styrene-Based Suspension Polymerized Toners, Korean Chemical Engineering Research (Oct. 2012), 50 (5), pp. 923-928.

Zeman, Frank. "Effect of steam hydration on performance of lime sorbent for $CO_2$ capture," International Journal of Greenhouse Gas Control, 2 (2008) pp. 203-209.

Zhu, Lu et al. "Water Treatment Technology, Second Edition." East China University of Science and Technology Press, Aug. 2016, 18 pages, with English excerpt.

\* cited by examiner

RHEOLOGY-MODIFYING AGENTS FOR SLURRIES

BACKGROUND

1. Field of the Invention

The present disclosure generally relates to rheology-modifying agents useful for modifying the rheology of slurries. More particularly, the present disclosure relates to rheology-modifying agents useful for modifying the rheology of lime slurries and/or magnesium hydroxide slurries.

2. Description of the Related Art

Slurries of lime and/or magnesium hydroxide are commonly added to lime and warm lime softeners to treat water hardness (i.e., remove hard water ions) and to assist in silica removal. If these ions are not removed from the water, the subsequent equipment that contacts the water will obtain hard water deposits and fouling of the equipment will occur. Hard water fouling can occur in, for example, heat exchangers, evaporators, and boilers. Heat exchangers, evaporators, and boilers can be used to produce hot water and/or steam, which may be used in various processes, such as hydrocarbon production and power generation. Further, lime and magnesium hydroxide slurries can also be added to scrubbers to assist with the scrubbing of acid gasses, such as $SO_2$, $H_2S$, and $CO_2$, and magnesium hydroxide slurries can be used for adjusting pH during wastewater treatment.

Feed lines are used to transport the slurries to the various pieces of equipment used in the processes. Without proper treatments for the lime and magnesium hydroxide slurries, the lime and magnesium can form deposits in the feed lines, thereby reducing the slurry feed flow, and eventually plugging or clogging the feed line. Once clogged, the hard deposits in the feed lines are typically removed or dissolved by cleaning the feed lines with acids, such as HCl, which is not safe and not easy to handle. Moreover, such an acid treatment requires special procedures for waste disposal.

Prior art methods used to clean clogged feed lines are thus dangerous, costly, and require extended periods of downtime. When a slurry feed line becomes clogged, the entire operation needs to be shut down, the feed lines need to be taken off-line, and subsequently cleaned with an acid. In certain processes, these steps must be repeated, sometimes as frequently as once a week, thereby greatly increasing the total time needed to achieve the intended goal of the overall process, such as hydrocarbon production.

BRIEF SUMMARY

The present disclosure provides rheology-modifying agents and methods of modifying the rheology of slurries.

In some embodiments, the present disclosure provides a method of modifying the rheology of a slurry. The method comprises the step of adding a rheology-modifying agent to the slurry, the rheology-modifying agent comprising a polymer, wherein the polymer comprises a first monomer, a second monomer, a third monomer, and a fourth monomer, wherein the first, second, third, and fourth monomers are chemically different.

In some embodiments, the slurry comprises magnesium hydroxide. In certain embodiments, the slurry comprises lime.

In some embodiments, the polymer is added to the slurry in an amount of about 0.01 ppm to about 1,000 ppm.

In certain embodiments, the rheology-modifying agent comprises sodium carbonate.

In some embodiments, the rheology-modifying agent excludes phosphorous.

In at least one embodiment, the first monomer is selected from the group consisting of acrylic acid ("AA"), methacrylic acid ("MAA"), a butenoic acid, a pentenoic acid, a propenoic acid, maleic acid ("MA"), maleic anhydride, fumaric acid, itaconic acid, glutaconic acid, muconic acid, succinic acid, citric acid, aconitic acid, a salt of any of the foregoing acids, and a conjugate base of any of the foregoing acids.

In particular embodiments, the polymer comprises about 55 mol %, or more, of the first monomer.

In some embodiments, the second monomer is selected from the group consisting of a second sulfonated acid, a second carboxylic acid, a salt of any of the foregoing acids, and a conjugate base of any of the foregoing acids. In some embodiments, the second monomer is selected from the group consisting of 2-acrylamido-2-methylpropane sulfonic acid ("ATBS"), sulfostyrene, vinylsulfonic acid, methallylsulfonic acid, a salt of any of the foregoing acids, and a conjugate base of any of the foregoing acids. In certain embodiments, the polymer comprises about 45 mol %, or less, of the second monomer.

In at least one embodiment, the third monomer is selected from the group consisting of a third sulfonated acid, a third carboxylic acid, a salt of any of the foregoing acids, a conjugate base of any of the foregoing acids, and an alkylated molecule. In some embodiments, the alkylated molecule is selected from the group consisting of N-tert-butylacrylamide, N-isopropylacrylamide, butoxymethylacrylamide, N,N-dimethylacrylamide, N,N-diethylacrylamide, a dimethylamino ethyl methacrylate acid salt, and N-vinylpyrrolidone. In certain embodiments, the polymer comprises about 10 mol %, or less, of the third monomer.

In some embodiments, the fourth monomer is selected from the group consisting of an alkylated molecule, a fourth carboxylic acid, a salt of the fourth carboxylic acid, and a conjugate base of the fourth carboxylic acid.

In some embodiments, the polymer comprises a fifth monomer, which is chemically different than the first, second, third, and fourth monomers.

In certain embodiments, the polymer comprises about 85 weight % AA, about 10 weight % ATBS, about 3 weight % itaconic acid, and about 2 weight % tert-butyl acrylamide.

In particular embodiments, the polymer comprises a weight average molecular weight of about 500 g/mol to about 30,000 g/mol.

In at least one embodiment, the polymer comprises a tagging agent.

In some embodiments, the present disclosure provides a method of modifying the rheology of a slurry. The method comprises the step of adding a rheology-modifying agent to the slurry, the rheology-modifying agent comprising a polymer, wherein the polymer comprises a first monomer, a second monomer, and a third monomer, wherein each of the first, second, and third monomers are chemically different, provided that the polymer does not comprise a combination of acrylic acid, acrylamide, and sulfonated acrylamide.

In still further embodiments, the present disclosure provides for the use of a rheology-modifying agent to modify the rheology of a slurry, the rheology-modifying agent comprising a polymer, wherein the polymer comprises a first monomer, a second monomer, a third monomer, and a fourth monomer, wherein the first, second, third, and fourth monomers are chemically different. The slurry may comprise a member selected from the group consisting of lime, magnesium hydroxide, and any combination thereof.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

Not applicable.

DETAILED DESCRIPTION

The present disclosure relates to compositions and methods for modifying the rheology of slurries. In certain aspects, the slurries are lime slurries. "Lime" may also be referred to as calcium oxide or CaO. In other aspects, the slurries are magnesium hydroxide slurries.

Lime slurries can become highly viscous, for example, when they have more than about a 30% lime concentration. In accordance with the present disclosure, various rheology-modifying agents are disclosed that can beneficially modify the rheology of the lime slurries (and/or magnesium hydroxide slurries), thereby inhibiting or minimizing deposit formation and feed line clogging. In accordance with the present disclosure, high molecular weight lime slurries (and/or magnesium hydroxide slurries) may be prepared with reduced viscosities by adding one or more rheology-modifying agents to the slurries.

In some aspects, a rheology-modifying agent is added to a lime slurry (or a magnesium hydroxide slurry) to modify its rheology. Not only can the rheology-modifying agent reduce the viscosity of a slurry, it can prevent agglomeration of lime particles. The rheology-modifying agent may also act as a scale inhibitor and reduce scaling during application of the lime (or magnesium hydroxide) slurry. In some aspects, the rheology-modifying agent comprises one or more polymers. In some aspects, the rheology-modifying agent comprises one or more polymers and sodium carbonate. The polymers may include three or more polymerized monomers, such as 3-10 monomers, 3-7 monomers, 3-5 monomers, 3 monomers, 4 monomers, 5 monomers, or more than 5 monomers, as further described below. The polymers (and rheology-modifying agents comprising the polymers) may be free of (or substantially free of) phosphorous or phosphorous-containing materials, such as phosphates, phosphonates, and the like.

The monomers that can be polymerized to form the polymers disclosed herein are not particularly limited. For example, a first monomer may be selected from AA, MAA, a butenoic acid (e.g., crotonic acid), a pentenoic acid, a propenoic acid, any other unsaturated monocarboxylic acid capable of polymerizing, and any combination thereof. Dicarboxylic acid monomers may also be used, such as MA or maleic anhydride, fumaric acid, itaconic acid, glutaconic acid, muconic acid, succinic acid, any other unsaturated dicarboxylic acid or anhydride thereof capable of polymerizing, and any combination thereof. Tricarboxylic acids (or greater) may also be used, such as citric acid, aconitic acid, or any other carboxylic acid having three or more carboxylic acid moieties. The polymers may also comprise a salt of any of the foregoing or a conjugate base of any of the foregoing. Carboxylic acid salts may include lithium, beryllium, sodium, magnesium, potassium, calcium, and zinc, for example.

The first monomer may constitute about 55 mol %, or more, of the polymer, such as about 55 mol % to about 99 mol %, about 60 mol % to about 98 mol %, about 70 mol % to about 95 mol %, about 80 mol % to about 99 mol %, about 90 mol % to about 97 mol %, about 93 mol % to about 99 mol %, about 96 mol % to about 99 mol %, about 92 mol % to about 94 mol %, about 83 mol % to about 87 mol %, about 88 mol % to about 92 mol %, about 93 mol % to about 96 mol %, about 95 mol % to about 98.5 mol %, about 60 mol %, about 70 mol %, about 80 mol %, about 85 mol %, about 90 mol %, about 92.9 mol %, about 93.3 mol %, about 95 mol %, about 96 mol %, about 96.4 mol %, about 98.4 mol %, or about 98.5 mol %, or less, of the polymer.

The first monomer may constitute about 50 wt %, or more, of the polymer, such as about 50 wt % to about 95 wt %, about 60 wt % to about 90 wt %, about 70 wt % to about 85 wt %, about 80 wt % to about 95 wt %, about 85 wt % to about 90 wt %, about 90 wt % to about 95 wt %, about 73 wt % to about 77 wt %, about 78 wt % to about 82 wt %, about 83 wt % to about 87 wt %, about 88 wt % to about 92 wt %, about 93 wt % to about 96 wt %, about 60 wt %, about 70 wt %, about 80 wt %, about 85 wt %, about 90 wt %, about 95 wt %, or about 96 wt %, or less, of the polymer.

The polymers disclosed herein may comprise a second monomer. The second monomer may comprise a sulfonated acid, a residue thereof, a carboxylic acid, or a residue thereof, that is chemically different than that of the first monomer. The sulfonated acid may include a sulfonated acid moiety, a salt thereof, or a conjugate base thereof. The sulfonated acid may include an amide moiety, such as in ATBS. Suitable sulfonated acids may include ATBS, sulfostyrene, vinylsulfonic acid, methallylsulfonic acid, a salt of the foregoing (e.g., sodium methallyl sulfonate or ATBS sodium salts), or a conjugate base of the foregoing (e.g., methallyl sulfonate).

The second monomer may constitute about 45 mol %, or less, of the polymer, such as about 0.01 mol % to about 45 mol %, about 1 mol % to about 40 mol %, about 20 mol % to about 30 mol %, about 0.01 mol % to about 15 mol %, about 0.01 mol % to about 10 mol %, about 0.01 mol % to about 5 mol %, about 2 mol % to about 4 mol %, about 1 mol % to about 5 mol %, about 5 mol % to about 15 mol %, about 10 mol % to about 15 mol %, about 5 mol % to about 10 mol %, about 18 mol % to about 22 mol %, about 13 mol % to about 17 mol %, about 8 mol % to about 12 mol %, about 3 mol % to about 7 mol %, about 2 mol %, about 3 mol %, about 3.6 mol %, about 3.7 mol %, about 4 mol %, about 5 mol %, about 10 mol %, about 15 mol %, about 20 mol %, less than about 20 mol %, or about 10 mol %, or less, of the polymer.

The second monomer may constitute about 50 wt %, or less, of the polymer, such as about 0.01 wt % to about 50 wt %, about 10 wt % to about 40 wt %, about 20 wt % to about 30 wt %, about 0.01 wt % to about 15 wt %, about 0.01 wt % to about 10 wt %, about 0.01 wt % to about 5 wt %, about 5 wt % to about 15 wt %, about 10 wt % to about 15 wt %, about 5 wt % to about 10 wt %, about 18 wt % to about 22 wt %, about 13 wt % to about 17 wt %, about 8 wt % to about 12 wt %, about 3 wt % to about 7 wt %, about 5 wt %, about 10 wt %, about 15 wt %, less than about 20 wt %, or about 10 wt %, or less, of the polymer.

In some embodiments, the second monomer of the polymer comprises one or more of MA, ATBS, sulfostyrene, methallylsulfonic acid, or residues thereof, where the second monomer is chemically different (e.g., chemically distinct) from the first monomer. In some embodiments, the polymer comprises AA and ATBS. The AA may constitute about 90 mol % to about 99 mol % (e.g., about 95 mol % to about 98.5 mol %) of the polymer and the ATBS may constitute at least a portion of the balance of the polymer. In certain embodiments, the polymer comprises MA and ATBS. The MA may constitute about 90 mol % to about 99 mol % (e.g., about 95 mol % to about 98.5 mol %) of the polymer and the ATBS may constitute at least a portion of the balance of the polymer. In some embodiments, the polymer comprises MAA and ATBS. The MAA may constitute about 90 mol % to about 99 mol % (e.g., about 95 mol % to about 98.5 mol %) of the polymer and the ATBS may constitute at least a portion of the balance of the polymer.

In some embodiments, the polymer comprises a first monomer including one of AA, MA, MAA, or residues thereof, and a second monomer including one of sulfostyrene, methallyl sulfonate, or residues thereof. For example, the first monomer may be AA or MA and the second monomer may be sulfostyrene. The AA, MA, or MAA may constitute about 90 mol % to about 99 mol % (e.g., about 95 mol % to about 98.5 mol %) of the polymer and the sulfostyrene or methallyl sulfonate may constitute at least a portion of the balance of the polymer.

The polymers disclosed herein may also include a third monomer. The third monomer may comprise a sulfonated acid or a residue thereof, a third, chemically different carboxylic acid (e.g., differing from the carboxylic acids of the first and second monomers), or an alkylated molecule or a residue thereof. The sulfonated acid (e.g., sulfonic acids) may include a sulfonate moiety, a salt thereof, or a conjugate base thereof. In an embodiment, each of the first, second, and third monomers are chemically different from each other. For example, the second monomer may include MA, the first monomer may include AA, and the third monomer may be chemically different from each of the first and second monomers.

In some embodiments, the alkylated molecule or residue thereof (e.g., alkylated acrylamide(s)) comprises at least one hydrophobic moiety such as an alkyl group of one or more carbons. Suitable alkylated molecules may include N-tert-butylacrylamide, N-isopropylacrylamide, butoxymethylacrylamide, N,N-dimethylacrylamide, N,N-diethylacrylamide, dimethylamino ethyl methacrylate acid salts (including, but not limited to, sulfuric acid and hydrochloride acid salts), N-vinylpyrrolidone, analogues of any of the foregoing, residues of any of the foregoing, or any other molecule suitable for radical polymerization and being at least substantially hydrophobic.

The third monomer may comprise one or more of any of the carboxylic acids or residues thereof disclosed above with respect to the first monomer and/or the second monomer, so long as the carboxylic acid of the third monomer is chemically different (e.g., a different chemical species) from the carboxylic acid of the first monomer and the second monomer. For example, the third monomer may comprise itaconic acid or crotonic acid, the first monomer may comprise AA, and the second monomer may comprise MA or MAA.

The third monomer may constitute about 10 mol %, or less, of the polymer, such as about 0.01 mol % to about 10 mol %, about 1 mol % to about 9 mol %, about 2 mol % to about 8 mol %, about 3 mol % to about 7 mol %, about 4 mol % to about 6 mol %, about 5 mol % to about 10 mol %, about 0.01 mol % to about 5 mol %, about 1 mol % to about 5 mol %, about 1 mol % to about 3 mol %, about 1.5 mol % to about 3.5 mol %, about 3 mol % to about 5 mol %, about 5 mol % to about 8 mol %, about 8 mol % to about 10 mol %, about 1.8 mol %, about 2 mol %, about 3 mol %, about 5 mol %, about 10 mol %, about 7 mol % or less, about 5 mol % or less, or about 3 mol %, or less, of the polymer.

The third monomer may constitute about 10 wt %, or less, of the polymer, such as about 0.01 wt % to about 10 wt %, about 1 wt % to about 9 wt %, about 2 wt % to about 8 wt %, about 3 wt % to about 7 wt %, about 4 wt % to about 6 wt %, about 5 wt % to about 10 wt %, about 0.01 wt % to about 5 wt %, about 1 wt % to about 5 wt %, about 3 wt % to about 5 wt %, about 5 wt % to about 8 wt %, about 8 wt % to about 10 wt %, about 5 wt %, about 10 wt %, about 7 wt % or less, or about 5 wt %, or less, of the polymer.

In some embodiments, the first monomer comprises one or more of AA, MA, MAA, or residues thereof, the second monomer comprises one or more of MA, MAA, ATBS, or residues thereof, and the third monomer comprises one or more of ATBS, sulfostyrene, methallylsulfonic acid, tert-butylacrylamide, dimethylacrylamide, itaconic acid, crotonic acid, or residues thereof, wherein the first, second, and third monomers are chemically different from each other.

In some embodiments, the AA residue may constitute about 90 mol % to about 98 mol % of the polymer, the MA residue may constitute about 1 mol % to about 7 mol % of the polymer, and the ATBS residue may constitute at least a portion of the balance of the polymer (e.g., about 1 mol % to about 7 mol %). The AA residue may constitute about 90 mol % to about 98 mol % of the polymer, the MAA residue may constitute about 1 mol % to about 7 mol % of the polymer, and the ATBS residue may constitute at least a portion of the balance of the polymer (e.g., about 1 mol % to about 7 mol %).

In some embodiments, the polymer comprises an AA residue, an ATBS residue, and an itaconic acid or crotonic acid residue. The AA residue may constitute about 90 mol % to about 98 mol % of the polymer, the ATBS residue may constitute about 1 mol % to about 7 mol % of the polymer, and the itaconic acid or crotonic residue may constitute at least a portion of the balance of the polymer (e.g., about 1 mol % to about 7 mol %).

In some embodiments, the polymer comprises an AA residue, ATBS residue, and tert-butylacrylamide residue. The AA residue may constitute about 90 mol % to about 98 mol % of the polymer, the ATBS residue may constitute about 1 mol % to about 7 mol % of the polymer, and the tert-butylacrylamide residue may constitute at least a portion of the balance of the polymer (e.g., about 1 mol % to about 7 mol %).

In some embodiments, the polymer comprises an AA residue, ATBS residue, and dimethyl acrylamide residue. The AA residue may constitute about 90 mol % to about 98 mol % of the polymer, the ATBS residue may constitute about 1 mol % to about 7 mol % of the polymer, and the dimethylacrylamide residue may constitute at least a portion of the balance of the polymer (e.g., about 1 mol % to about 7 mol %).

In some embodiments, the polymers disclosed herein may comprise a fourth monomer. The fourth monomer may comprise an alkylated molecule or a residue thereof, or a fourth carboxylic acid or a residue thereof (which is chemically different than the carboxylic acid or residue thereof of the first, second, and third monomers). In some embodiments, each of the first, second, third, and fourth monomers are chemically different from each other.

In some embodiments, the alkylated molecule of the fourth monomer comprises at least one alkyl moiety, a residue thereof, a salt thereof, or a conjugate base thereof. In additional embodiments, the fourth monomer comprises any of the carboxylic acids or residues thereof disclosed above with respect to the first, second, and/or third monomers, so long as the carboxylic acid of the fourth monomer is chemically different from the carboxylic acid of the first, second, and third monomers. For example, the fourth monomer may include itaconic acid or crotonic acid and one or more of the first, second, and third monomers may include or consist of AA, MA, and/or MAA.

The fourth monomer may constitute about 10 mol %, or less, of the polymer, such as about 0.01 mol % to about 10 mol %, 0.01 mol % to about 5 mol %, about 1 mol % to about 7 mol %, about 2 mol % to about 6 mol %, about 3 mol % to about 5 mol %, about 1 mol % to about 4 mol %, about 1 mol % to about 3 mol %, about 1.5 mol % to about 3 mol %, about 4 mol % to about 6 mol %, about 5 mol % to about 10 mol %, about 1 mol % to about 5 mol %, about 3 mol % to about 5 mol %, about 5 mol % to about 8 mol %, about 8 mol % to about 10 mol %, about 5 mol %, about 10 mol %, about 7 mol % or less, about 5 mol % or less, or about 3 mol %, or less, of the polymer.

The fourth monomer may constitute about 10 wt %, or less, of the polymer, such as about 0.01 wt % to about 10 wt %, 0.01 wt % to about 5 wt %, about 1 wt % to about 9 wt %, about 2 wt % to about 8 wt %, about 3 wt % to about 7 wt %, about 4 wt % to about 6 wt %, about 5 wt % to about 10 wt %, about 1 wt % to about 5 wt %, about 3 wt % to about 5 wt %, about 5 wt % to about 8 wt %, about 8 wt % to about 10 wt %, about 5 wt %, about 10 wt %, about 7 wt % or less, or about 5 wt %, or less, of the polymer.

In some embodiments, the first monomer of the polymer comprises one of AA, MA, MAA, or residues thereof. The second monomer of the polymer comprises one of MA, MAA, ATBS, or residues thereof, where the second monomer is chemically different from the first monomer. The third monomer of the polymer comprises one of ATBS, sulfostyrene, methallylsulfonic acid, tert-butylacrylamide, dimethylacrylamide, itaconic acid, crotonic acid or residues thereof, where the third monomer is chemically different from the second monomer and the first monomer. The fourth monomer of the polymer comprises a member selected from the group consisting of tert-butylacrylamide, dimethylacrylamide, itaconic acid, crotonic acid, or residues thereof, where the fourth monomer is chemically different from the first, second, and third monomers.

In some embodiments, the polymer comprises AA, MA, ATBS, and tert-butylacrylamide residue. The AA residue may constitute about 85 mol % to about 95 mol % of the polymer, the MA residue may constitute about 1 mol % to about 7 mol % of the polymer, the ATBS residue may constitute about 1 mol % to about 7 mol % of the polymer, and the tert-butylacrylamide residue may constitute at least a portion of the balance of the polymer (e.g., about 1 mol % to about 7 mol %). The AA residue may constitute about 93 mol % of the polymer, the MA residue may constitute about 2 mol % of the polymer, the ATBS residue may constitute about 3.5 mol % of the polymer, and the tert-butylacrylamide residue may constitute about 1.5 mol % of the polymer.

In some embodiments, the polymer comprises AA, ATBS, itaconic acid or crotonic acid, and tert-butylacrylamide. The AA residue may constitute about 80 mol % to about 95 mol % of the polymer, the ATBS residue may constitute about 1 mol % to about 7 mol % of the polymer, the itaconic acid or crotonic acid residue may constitute about 1 mol % to about 7 mol % of the polymer, and the tert-butylacrylamide residue may constitute about 1 mol % to about 7 mol % of the polymer. MA or MAA may be used in place of the AA, where the MA is chemically different from each of the other monomers in the polymer.

In some embodiments, the polymers disclosed herein may comprise a fifth monomer. The fifth monomer may comprise, for example, a carboxylic acid, or a residue thereof, that is chemically different than the carboxylic acid, or residue thereof, of the other monomers in the polymer. In some embodiments, each of the first, second, third, fourth, and fifth monomers are chemically different from each other.

The carboxylic acid of the fifth monomer may be any of the carboxylic acids (or residues thereof) disclosed in connection with the first, second, third, and/or fourth monomers, so long as the carboxylic acid of the fifth monomer is chemically different from the carboxylic acid of the first monomer, second monomer, third monomer, and/or fourth monomer. For example, the fifth monomer may comprise MAA and one or more of the first, second, third, and/or fourth monomers may comprise or consist of AA, MA, itaconic acid, or crotonic acid.

The fifth monomer may constitute about 10 mol %, or less, of the polymer, such as about 0.01 mol % to about 10 mol %, 0.01 mol % to about 5 mol %, about 1 mol % to about 7 mol %, about 2 mol % to about 6 mol %, about 1 mol % to about 3 mol %, about 3 mol % to about 5 mol %, about 4 mol % to about 6 mol %, about 5 mol % to about 10 mol %, about 1 mol % to about 5 mol %, about 6 mol % to about 8 mol %, about 1 mol %, about 1.5 mol %, about 2 mol %, about 2.5 mol %, about 3 mol %, about 3.5 mol %, about 4 mol %, about 5 mol %, about 7 mol %, about 10 mol %, about 8 mol % or less, about 5 mol % or less, or about 3 mol %, or less, of the polymer.

The fifth monomer may constitute about 10 wt %, or less, of the polymer, such as about 0.01 wt % to about 10 wt %, 0.01 wt % to about 5 wt %, about 1 wt % to about 9 wt %, about 2 wt % to about 8 wt %, about 3 wt % to about 7 wt %, about 4 wt % to about 6 wt %, about 5 wt % to about 10 wt %, about 1 wt % to about 5 wt %, about 3 wt % to about 5 wt %, about 6 wt % to about 8 wt %, about 3 wt %, about 5 wt %, about 7 wt %, about 10 wt %, about 8 wt % or less, or about 7 wt %, or less, of the polymer.

In some embodiments, a sulfonated acid may be used in place of any of the above listed second, third, fourth, and/or fifth monomers in the polymer. For example, ATBS may be used instead of the second carboxylic acid of the second monomer. The sulfonated acid may be present in the same mol % or wt % as the respective monomer it replaces. For example, if ATBS were used in place of the second carboxylic acid, the ATBS may be present in the same mol % or wt % as the second carboxylic acid of the second monomer.

In some embodiments, the polymer comprises an AA residue, MA residue, tert-butylacrylamide residue, itaconic acid or crotonic acid residue, and MAA residue. The AA residue may constitute about 80 mol % to about 96 mol % of the polymer, the MA residue may constitute about 1 mol % to about 7 mol % of the polymer, the tert-butylacrylamide residue may constitute about 1 mol % to about 7 mol % of the polymer, the itaconic acid or crotonic acid residue may constitute about 1 mol % to about 5 mol % of the polymer, and the MAA residue may constitute at least a portion of the balance of the polymer (e.g., about 1 mol % to about 10 mol %). In some embodiments, the AA residue constitutes about 90 mol % of the polymer, the MA residue constitutes about 3 mol % of the polymer, the tert-butylacrylamide residue constitutes about 1.5 mol % of the polymer, the itaconic acid or crotonic acid residue constitutes about 2 mol % of the polymer, and the MAA residue constitutes about 3.5 mol % of the polymer.

As discussed below, the polymers disclosed herein can exhibit a wide range of molecular weights. They can be mixed with water in a wide range of dosages. The polymers may also comprise a fluorescent tag/marker. In some embodiments, the polymers disclosed herein may exclude phosphorous or phosphorous-containing moieties. The polymers may be formed in a liquid, semi-liquid (e.g., gel), or solid form, depending on the specific polymer, monomeric make-up, and/or molecular weight thereof.

The polymer solutions disclosed herein may exhibit a viscosity of about 100-200 cps as measured by a Brookfield viscometer at 25 degrees Celsius with a #3 spindle at 30 rpm. The viscosity of any of the polymer compositions disclosed herein, prior to mixing in water and/or a water source, may be about 250 cps or less, such as about 50 cps to about 250 cps, about 100 cps to about 200 cps, about 120 cps to about 180 cps, about 140 cps, to about 160 cps, about 80 cps to about 120 cps, about 120 cps to about 150 cps, about 150 cps to about 180 cps, or about 180 cps to about 200 cps.

The molecular weight ($M_w$) of any of the polymers disclosed herein, prior to mixing in water and/or a water source, may be at least about 500 g/mol, such as about 500 g/mol to about 50,000 g/mol, about 1000 g/mol to about 20,000 g/mol, about 2,000 g/mol to about 12,000 g/mol, about 500 g/mol to about 3,000 g/mol, about 2,000 g/mol to about 8,000 g/mol, about 3,000 g/mol to about 6,000 g/mol, about 6,000 g/mol to about 9,000 g/mol, about 8,000 g/mol to about 10,000 g/mol, about 9,000 g/mol to about 12,000 g/mol, about 8,000 g/mol to about 15,000 g/mol, about 12,000 g/mol to about 15,000 g/mol, about 15,000 g/mol to about 20,000 g/mol, about 18,000 g/mol to about 22,000 g/mol, 15,000 g/mol to about 25,000 g/mol, about 20,000 g/mol to about 30,000 g/mol, about 30,000 g/mol to about 40,000 g/mol, about 40,000 g/mol to about 50,000 g/mol, or about 1,000 g/mol, about 2,000 g/mol, about 3,000 g/mol, about 4,000 g/mol, about 5,000 g/mol, about 7,000 g/mol, about 10,000 g/mol, about 11,000 g/mol, about 12,000 g/mol, about 14,000 g/mol, about 15,000 g/mol, about 18,000 g/mol, about 20,000 g/mol, about 22,000 g/mol, about 25,000 g/mol or less, or about 30,000 g/mol or less.

In some embodiments, the polymers disclosed herein may comprise a tagging agent. The base polymers (or any monomer thereof) may be polymerized with a tagging agent and the resulting polymer may be monitored fluorescently, for example. The tagging agent can be polymerized with any of the monomers/polymers disclosed herein. Suitable tagging agents may include one or more monomers that are naphthalene-containing, anthracene-containing, quinoline-containing, isoquinoline-containing, indole-containing, pyrene-containing, benzimidazole-containing, coumarin-containing, fluorescein-containing, quinoxaline-containing, xanthylium-containing, boron-dipyrromethene-containing, bimane-containing, rhodamine-containing, or naphthalimide-containing. Specific monomers that can be used to fluorescently tag a polymer include but are not limited to 4-methoxy-N-(3-N',N'-dimethylaminopropyl)naphthalimide (quaternary salt), N-allyl-4-(2-N',N'-dimethylaminoethoxy) naphthalimide (methyl sulfate quaternary salt), 4-methoxy-N-(3-N',N'-dimethylam inopropyl) naphthalimide (allyl chloride quaternary salt), 5-allyloxy-4'-carboxy-1,8-naphthoylene-1',2'-benzimidazole, 6-Vinylbenzyloxy-4'-carboxy-1,8-naphthoylene-1'2'-benzimidazole, 4-methoxy-N-(3-N',N'-dimethylaminopropyl)naphthalimide (2-hydroxy-3-allyloxypropyl quat), quaternary ammonium salt of dimethylaminopropylmethacrylamide and 2-(chloromethyl) quinoline, quaternary ammonium salt of dimethylaminopropylmethacrylamide and 9-(chloromethyl)anthracene, quaternary ammonium salt of dimethylaminopropylmethacrylamide and 2-(chloromethyl) benzimidazole, quaternary ammonium salt of dimethylaminopropylmethacrylamide and 4-(bromomethyl)pyrene, quaternary ammonium salt of dimethylaminopropylmethacrylamide and 1-(chloromethyl)naphthalene, any additional quaternary ammonium salt of dimethylaminopropylmethacrylamide and halo-alkyl derivative of the fluorescent chromophores previously listed, or any other fluorescent molecule capable of polymerizing with any of the monomers and/or polymers disclosed herein.

The tagging agent may constitute less than about 10 mol % of any of the polymers disclosed herein, such as less than about 1 mol %, less than about 0.1 mol %, or less than about 0.01 mol % of the polymer. The tagging agent may constitute less than about 10 wt % of the any of the polymers disclosed herein, such as about 0.01 wt % to about 10 wt %, about 1 wt % to about 3 wt %, about 4 wt % to about 6 wt %, about 7 wt % to about 10 wt %, 2 wt % to about 5 wt %, less than about 5 wt %, less than about 3 wt %, less than about 1 wt %, about 0.01 wt % to about 1 wt %, about 0.01 wt % to about 0.1 wt %, or less than about 0.1 wt % of the polymer.

When the polymers herein are tagged with a tagging agent, one can determine how much polymer composition is being delivered in the water source and/or how much polymer composition is being exhausted during use. A fluorometer, UV spectrometer, or other fluorescent material detecting apparatus may be used to determine the amount of fluorescent tag in a water source, and by extension, the amount of tagged polymer therein. Such equipment can be used to constantly monitor the concentration of a tagged polymer in a system or can be used to monitor said concentrations on demand (e.g., randomly or at selected intervals).

In some embodiments, the polymers disclosed herein may include additional monomers. Additional monomers may include hydrogen bonding or cationic monomers. For example, a polymer may additionally include a monomer or residue formed from a hydrogen bonding molecule and/or a cationic molecule. Suitable hydrogen bonding molecules include, by way of example, acrylamide, methacrylamide, N-vinyl formamide, methylene bis acrylamide, triallylamine and acid salts thereof, ethylene glycol dimethacrylate, hydroxymethylacrylate, hydroxyethylacrylate, hydroxypropylacrylate, hydroxypropylmethacrylate, diethylene glycol dimethacrylate, triethylene glycol dimethylacrylate, polyethylene glycol dimethacrylate, glycidyl methacrylate, vinyl alcohol, vinyl acetate, derivatives of any of the foregoing, salts of any of the foregoing, or analogues of any of the foregoing. Suitable cationic molecules include, by way of example, dimethylaminoethyl acrylate methyl chloride tetranary salts, dimethylaminoethyl acrylate benzyl chloride tetranary salts, dimethylaminoethyl acrylate methyl sulfate tetranary salt, dimethylaminoethyl methacrylate methyl sulfate tetranary salt, dimethylaminoethyl acrylamide methyl sulfate tetranary salts, dimethylaminopropyl acrylamide methyl sulfate tetranary salts, dimethylaminopropyl methacrylamide methyl sulfate tetranary salts, diallyldimethyl ammonium chloride, dimethylaminoethyl methacrylate methyl chloride tetranary salt, dimethylaminoethyl methacrylate benzyl chloride tetranary salt, methacrylamidopropyl trimethyl ammonium chloride, acrylamidopropyl trimethyl ammonium chloride, dissociated species of any of the foregoing, or analogues of any of the foregoing.

In some embodiments, any of the above listed species may be used to supply a polymerized monomer having a desired moiety (e.g., carboxylate groups) to the polymer composition. One or more of the above additional monomer species may be used in place of, or in addition to, any of the first, second, third, fourth, and/or fifth monomers disclosed herein. The additional monomers may be about 5 mol %, or less, of the polymer composition, such as 4 mol % or less, 3 mol %, or less, 2 mol % or less, or about 0.01 mol % to about 5 mol %, or more than about 1 mol % of the polymer composition including the same.

In some embodiments, the polymers disclosed herein may be mixed in water and/or a water source to result in a rheology-modifying agent. For example, any of the polymers disclosed herein may be dispersed in water (e.g., tap or deionized water) and then may be mixed in a water source. The polymers may be mixed directly into a water source. The polymers may be delivered to a water source in powder form or mixed in water, and then may be mixed into the water source. Any of the polymers disclosed herein may be emulsified in a water source. The polymers may be mixed into water and/or a water source by one or more of batch-wise, continuous (e.g., drip feed), or incremental addition(s) of the polymer.

The polymers of the rheology-modifying agents may be added to a slurry in any amount effective to modify the rheology of the slurry. For example, a polymer may be added at a dosage of about 0.01 ppm or more, such as about 0.01 ppm to about 1000 ppm, about 0.05 ppm to about 200 ppm, about 0.1 ppm to about 100 ppm, about 0.2 ppm to about 50 ppm, about 0.01 ppm to about 1 ppm, about 1 ppm to about 5 ppm, about 5 ppm to about 10 ppm, about 10 ppm to about 20 ppm, about 10 ppm to about 300 ppm, about 20 ppm to about 30 ppm, about 30 ppm to about 40 ppm, about 40 ppm to about 50 ppm, about 50 ppm to about 80 ppm, about 80 ppm to about 100 ppm, about 100 ppm to about 200 ppm, about 200 ppm to about 500 ppm, about 0.01 ppm to about 10 ppm, about 0.1 ppm to about 20 ppm, or about 0.5 ppm to about 10 ppm.

The dosage may be more than about 0.01 ppm and less than about 300 ppm, such as less than about 200 ppm, less than about 100 ppm, less than about 50 ppm, less than about 20 ppm, less than about 10 ppm, or less than about 5 ppm. The rheology-modifying agent may be added to a slurry continuously or fed batch-wise.

The amount of the rheology-modifying agent to be added to the slurry depends at least upon the amount of lime (or magnesium hydroxide) in the slurry. For example, a certain dosage of the rheology-modifying agent may be added to a 10% lime slurry and a different dosage could be added to a 30% lime slurry.

The rheology-modifying agent may be added to any process incorporating lime and/or magnesium hydroxide slurries. Such processes can include processes incorporating warm lime softeners, hot lime softeners, or any other process where hard water ions are being removed from water. Also, the rheology-modifying agent can be added to processes utilizing heat exchangers, evaporators, and boilers, such as hydrocarbon production processes and power generation processes. Further, the rheology-modifying agent can be added to scrubbers to assist with the scrubbing of acid gasses, such as $SO_2$, $H_2S$, and $CO_2$.

In one aspect, a method of modifying the rheology of a lime slurry is disclosed. The method can include the steps of providing a lime slurry and adding a rheology-modifying agent to the lime slurry. The lime slurry can be stored in a storage device. The rheology-modifying agent can be added into the slurry in the storage device. In certain aspects, the rheology-modifying agent comprises one or more of the polymers disclosed herein and optionally water.

In certain hydrocarbon production processes, a pond or similar water storage device is provided to store water (hereinafter "production water") to be used in connection with recovering hydrocarbons. This production water can come from many different sources and generally is not purified. Thus, the production water can contain high amounts of silica. The production water is fed into a warm lime softener to remove contaminants, such as silica. In certain operations, lime slurries and/or magnesium hydroxide slurries are also fed into the warm lime softener. The lime and/or magnesium hydroxide slurries assist in silica removal. For example, the silica is able to precipitate onto the magnesium hydroxide or lime. In certain situations, the pH of the medium inside of the warm lime softener is raised to facilitate silica precipitation. The precipitate is then separated from the water and the water can be fed from the warm lime softener to the next piece of equipment, such as the heat exchanger or the steam generator.

However, as previously mentioned, although lime slurries and magnesium hydroxide slurries provide the benefit of facilitating silica removal from the production water, the slurries can also form deposits on the feed lines used to feed the slurries into the warm lime softener. In certain aspects, a storage device is provided near the warm lime softener. The storage device can contain the lime slurry. In other aspects, a storage device is provided near the warm lime softener. The storage device can contain the magnesium hydroxide slurry. In further aspects, two or more storage devices are provided near the warm lime softener. At least one of the storage devices contains the lime slurry and at least one of the storage devices contains a magnesium hydroxide slurry. Feed lines connect the lime slurry and magnesium hydroxide slurry storage devices to the warm lime softener. Additionally, the feed lines are used to transport the lime slurry and magnesium hydroxide slurry from their respective storage devices to the warm lime softener. As discussed above, these feed lines will become fouled with lime and/or magnesium-containing deposits and after about one week to one month, the entire operation will need to be shut down and the feed lines will need to be cleaned. However, if any of the aforementioned rheology-modifying agents are added to the lime slurry and/or the magnesium hydroxide slurry, feed line deposits will not occur or they will be greatly reduced.

The processes contemplated by the present application can incorporate lime slurries and/or magnesium hydroxide slurries. In some embodiments, the rheology-modifying agents may be used in connection with a magnesium oxide slurry in the same manner that they are used in connection with magnesium hydroxide slurries.

In one or more embodiments, a method of modifying the rheology of a magnesium hydroxide slurry is disclosed. The method includes the steps of providing a magnesium hydroxide slurry and adding a rheology-modifying agent to the magnesium hydroxide slurry. The magnesium hydroxide slurry can be stored in a storage device. The rheology-modifying agent can be added into the slurry in the storage device. The rheology-modifying agent may comprise one or more of the polymers disclosed herein.

EXAMPLES

An experiment was conducted to determine the effectiveness of a rheology-modifying agent. The rheology-modifying agent comprised a polymer. The polymer comprised about 85 weight % AA, about 10 weight % ATBS, about 3 weight % itaconic acid, and about 2 weight % tert-butyl acrylamide. The polymer had a weight average molecular weight of about 14,000 g/mol.

A lime slurry was prepared (35% w/w) and the rheology-modifying agent was added thereto at a concentration of about 1%. The viscosity of the slurry was determined to be about 425 cps at 20 rpm using the Brookfield LV-DV III model and Spindle #3. The viscosity of the same slurry without the rheology-modifying agent was 2951 cps at 20 rpm.

As used herein, the term "molecular weight" refers to the weight average molecular weight ($M_w$).

As used herein, the term "chemically different" refers to chemical species having a different number of carbon atoms and/or different functionalities (e.g., moieties) from another species; different isomers; or two or more such differences. For the purposes of this disclosure, an acid, an ion, a conjugate base, or a salt of a chemical species is not considered chemically different from the chemical species.

The terms "comprise(s)," "include(s)," "having," "has," "can," "contain(s)," and variants thereof, as used herein, are intended to be open-ended transitional phrases, terms, or words that do not necessarily but may preclude the possibility of additional acts or structures. The singular forms "a," "and," and "the" include plural references unless the context clearly dictates otherwise.

The present disclosure also contemplates other embodiments "comprising," "consisting of," and "consisting essentially of," the embodiments or elements presented herein, whether explicitly set forth or not. Generally, and as determined by context, the term "comprise" or "comprises" used in the specification, may be interpreted to mean any of "comprising," "consisting of," or "consisting essentially of."

The terms "consisting essentially of" or "consist essentially of" mean that the methods and compositions may include additional steps, components, ingredients or the like, but only if the additional steps, components and/or ingredients do not materially alter the basic and novel characteristics of the claimed methods and compositions.

The term "about," which modifies, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like considerations. The term "about" also encompasses amounts that differ due to aging of a formulation with a particular initial concentration or mixture, and amounts that differ due to mixing or processing a formulation with a particular initial concentration or mixture. Where modified by the term "about," the claims appended hereto include equivalents to these quantities.

As used herein, the term "substantially," which modifies, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of non-limiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like considerations. Where modified by the term "substantially," the claims appended hereto include equivalents to these types and amounts of materials.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of modifying the rheology of a slurry, comprising:
    adding a rheology-modifying agent to the slurry, the rheology-modifying agent comprising a polymer,
    wherein the slurry comprises magnesium hydroxide or lime,
    wherein the polymer comprises about 85 weight % acrylic acid (AA), about 10 weight % 2-acrylamido-2-methylpropane sulfonic acid (ATBS), about 3 weight % itaconic acid, and about 2 weight % tert-butyl acrylamide.

2. The method of claim 1, wherein the rheology-modifying agent comprises sodium carbonate.

3. The method of claim 1, wherein the rheology-modifying agent excludes phosphorous.

4. The method of claim 1, wherein the polymer comprises a weight average molecular weight of about 500 g/mol to about 30,000 g/mol.

5. The method of claim 1, wherein the polymer comprises a tagging agent.

6. A method of modifying the rheology of a slurry, comprising:
adding a rheology-modifying agent to the slurry, the rheology-modifying agent comprising a polymer,
wherein the slurry comprises magnesium hydroxide or lime,
wherein the polymer comprises about 85 weight % AA, about 10 weight % ATBS, about 3 weight % itaconic acid, and about 2 weight % tert-butyl acrylamide.

7. The method of claim 6, wherein the rheology-modifying agent comprises sodium carbonate.

8. The method of claim 6, wherein the rheology-modifying agent excludes phosphorous.

9. A method of modifying the rheology of a slurry, comprising:
adding a rheology-modifying agent to the slurry, the rheology-modifying agent comprising a polymer,
wherein the slurry comprises magnesium hydroxide or lime,
wherein the polymer comprises about 60 to about 90 weight % of a first monomer selected from the group consisting of: AA, methacrylic acid, maleic acid, and maleic anhydride; about 5 to about 15 weight % of a second monomer selected from the group consisting of: ATBS, sulfostyrene, vinylsulfonic acid, methallylsulfonic acid, a salt of any of the foregoing acids, and a conjugate base of any of the foregoing acids; about 0.01 to about 10 weight % of a third monomer selected from the group consisting of: itaconic acid, and crontonic acid; and about 0.01 to about 10 weight % of a fourth monomer selected from the group consisting of: tert-butyl acrylamide and dimethylacrylamide.

10. The method of claim 9, wherein the rheology-modifying agent comprises sodium carbonate.

11. The method of claim 9, wherein the rheology-modifying agent excludes phosphorous.

12. The method of claim 9, wherein the first monomer is AA, the second monomer is ATBS, the third monomer is itaconic acid, and the fourth monomer is tert-butyl acrylamide.

13. The method of claim 9, wherein the polymer comprises about 85 weight % of the first monomer, about 10 weight % of the second monomer, about 3 weight % of the third monomer, and about 2 weight % of the fourth monomer.

14. The method of claim 9, wherein the polymer comprises about 85 weight % of the first monomer, and the first monomer is AA.

15. The method of claim 9, wherein the polymer comprises about 10 weight % of the second monomer, and the second monomer is ATBS.

16. The method of claim 9, wherein the polymer comprises about 3 weight % of the third monomer, and the third monomer is itaconic acid.

17. The method of claim 9, wherein the polymer comprises about 2 weight % of the fourth monomer, and the fourth monomer is tert-butyl acrylamide.

18. The method of claim 9, wherein the polymer comprises a weight average molecular weight of about 500 g/mol to about 30,000 g/mol.

19. The method of claim 9, wherein the polymer comprises a tagging agent.

* * * * *

UNITED STATES PATENT AND TRADEMARK OFFICE
CERTIFICATE OF CORRECTION

PATENT NO. : 10,822,442 B2  Page 1 of 1
APPLICATION NO. : 16/029978
DATED : November 3, 2020
INVENTOR(S) : J. Matthew Chudomel et al.

It is certified that error appears in the above-identified patent and that said Letters Patent is hereby corrected as shown below:

In the Claims

Column 16, Line 1, Claim 9, delete "crontonic" and insert -- cortonic --.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*